(12) United States Patent
Tarokh et al.

(10) Patent No.: US 7,801,231 B2
(45) Date of Patent: Sep. 21, 2010

(54) PREAMBLE TECHNIQUES FOR COMMUNICATIONS NETWORKS

(75) Inventors: Vahid Tarokh, Cambridge, MA (US); Shahrnaz Azizi, Portland, OR (US); Yang-seok Choi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 531 days.

(21) Appl. No.: 11/862,331

(22) Filed: Sep. 27, 2007

(65) Prior Publication Data

US 2009/0086832 A1 Apr. 2, 2009

(51) Int. Cl.
*H04K 1/10* (2006.01)
*H04L 27/28* (2006.01)

(52) U.S. Cl. .............. 375/260; 370/203; 370/204; 370/209

(58) Field of Classification Search ........... 375/260; 370/203–211

See application file for complete search history.

(56) References Cited

FOREIGN PATENT DOCUMENTS

WO   WO 2006/052774 A2 *   5/2006

OTHER PUBLICATIONS

Schmidl, T.M., et al, "Robust Frequency and Timing Synchronization for OFDM", IEEE Transactions on Communications, vol. 45, No. 12, Dec. 1997.
Davis, J.A., et al., "Peak-to-Mean Power Control in OFDM, Golay Complementary Sequences, and Reed-Muller Codes", IEEE Transactions on Information Theory, vol. 45, No. 7, Nov. 1999.

* cited by examiner

*Primary Examiner*—Curtis B Odom
(74) *Attorney, Agent, or Firm*—Kacvinsky Daisak PLLC (57) ABSTRACT

Techniques are disclosed involving preamble sequences. For instance, an apparatus includes a module to provide a preamble sequence having multiple values, where each of the values corresponds to an orthogonal frequency division multiplexing (OFDM) subcarrier. These multiple values may include multiple blocks of values based on a differentially encoded and scrambled row of a Hadamard matrix. The apparatus may further include a modulation module to produce an OFDM modulated signal from the preamble sequence. Further, techniques for the detection of such preambles are disclosed.

20 Claims, 7 Drawing Sheets

PREAMBLE TECHNIQUES FOR COMMUNICATIONS NETWORKS

BACKGROUND

For devices operating in digital communications systems, achieving synchronization is important so that transmitted data may be accurately received. In many networks, information is transmitted in packets having embedded preambles. Preambles include sequences of values that are known to receiving devices. Upon receiving a packet, a device may process the packet's preamble to obtain timing synchronization. Further, the device may process the preamble to perform various operations, such as frequency offset estimation, preamble index detection, and/or channel estimation.

IEEE 802.16 WiMAX (Worldwide Interoperability for Microwave Access) networks employ preambles in their transmitted packets. Future WiMAX implementations (such as the IEEE 802.16m WiMAX II networks that are currently under development) will also employ preambles in their transmitted packets.

Current WiMAX systems interlace subcarriers to obtain three subcarrier sets. Each set utilizes every third subcarrier and provides a three sub-symbol periodicity in the time domain. Since Fast Fourier Transform (FFT) sizes are not divisible by three, this current approach requires a more complex receiver. Also, differential coding is not currently employed for WiMAX preambles, although some differential decoding algorithms have been proposed for the processing of received preambles.

DETAILED DESCRIPTION

Various embodiments may be generally directed to preamble sequences. For instance, embodiments may provide preamble sequences that are constructed based on differential encoding of Hadamard matrices. Such Hadamard Matrices include, but are not limited to, Sylvester matrices. For example, embodiments may construct 128 real preamble sequences constructed from a 128×128 Sylvester matrix. Such preambles require the same amount of boosting power as those of current mobile WiMax (IEEE 802.16e) systems.

Further, such preambles may be differentially detected using a fast detection algorithm. For example, when employing the exemplary 128 real preamble sequences, only 1024 real additions and 256 real multiplications are needed for preamble detection. This is a two orders of magnitude reduction compared to detection techniques employed in current IEEE 802.16e WiMAX systems.

Moreover, preambles, as described herein, may have a time domain repetitive structure that allows for preamble receiving devices to employ a simple time-domain and frequency domain synchronization algorithm (the known Schmidl and Cox algorithm). Moreover, the preambles may have random-like characteristics. Also, in embodiments, preamble sequences may have an average peak-to-average power ratio (PAPR) that is less than or equal to 5.1 dB. The embodiments, however, are not limited to the features described above.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain arrangement by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment" or "in an embodiment" in various places in the specification are not necessarily all referring to the same embodiment.

Figure 1:
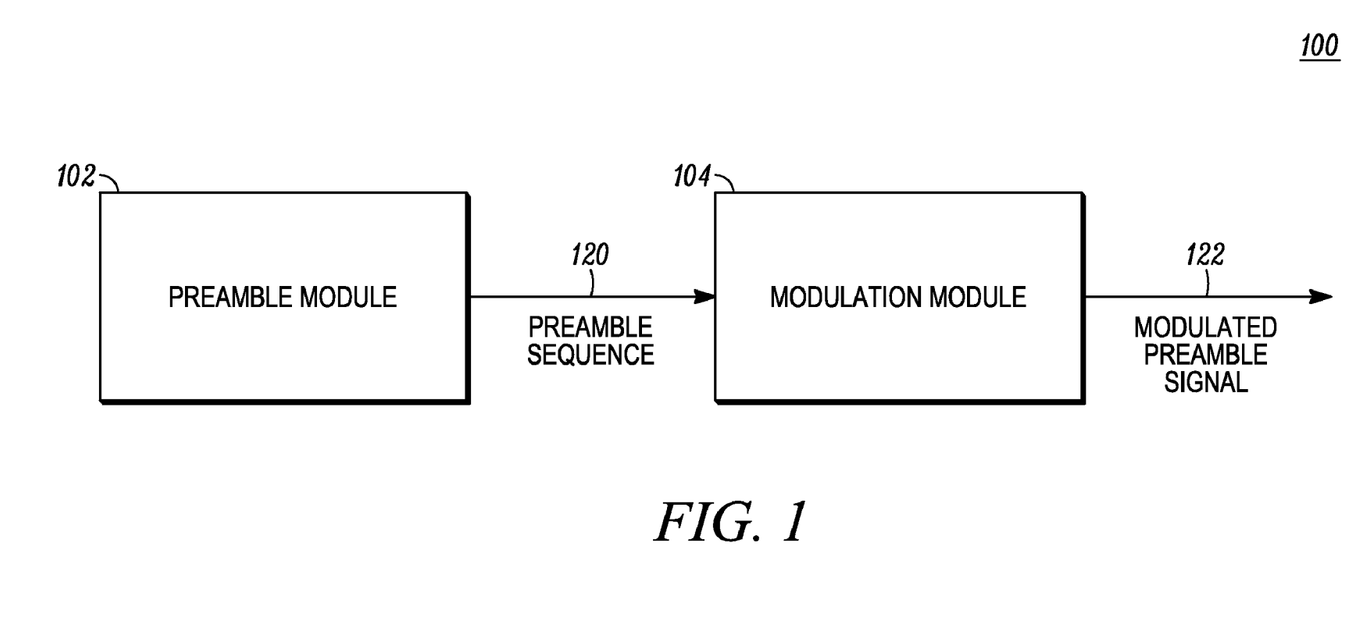
FIGS. 1 and 2 are exemplary apparatus diagrams.

FIG. 1 illustrates an embodiment of an apparatus 100 that may employ preambles, as described herein. Apparatus 100 may comprise various elements. For instance, FIG. 1 shows that apparatus 100 may include a preamble module 102, and a modulation module 104. The embodiments, however, are not limited to these depicted elements. The elements of apparatus 100 may be implemented in hardware, software, firmware, or any combination thereof.

Preamble module 102 provides one or more preamble sequences, such as a preamble sequence 120. These preamble sequences each include multiple values, where each value corresponds to an orthogonal frequency division multiplexing (OFDM) subcarrier. In embodiments, preamble module 102 may comprise a storage medium (e.g., memory) to store one or more preamble sequences, such as preamble sequence 120. Examples of storage media are provided below.

Preamble sequence(s) provided by preamble module 102 may be arranged and generated according to the techniques described herein. As described above, preamble sequence(s) provided by preamble module 102 may each include multiple values. These multiple values may include multiple blocks of values (e.g., "A blocks", as described below) that are based on a differentially encoded and scrambled row of a Hadamard matrix (e.g., a Sylvester matrix). Within these blocks, every other value may be a null. However, as described below, embodiments may employ A blocks having multiple nulls between non-zero values.

These multiple values may also include further blocks of values (e.g., "B blocks", as described below). These further blocks and the aforementioned blocks may be arranged alternately within the preamble sequence. The further blocks may be generated according to various techniques. For instance, the further blocks may consist of null values. Alternatively, the further blocks may each include alternating null and random values. However, one of these further blocks (e.g., block $B_4$, as described below) may include multiple consecutive null values. This may ensure that a DC (direct current) subcarrier is nulled.

In addition to the blocks described above, such preamble sequences may include yet further blocks. For instance, such preamble sequences may include blocks of null values (referred to as "NULL blocks"). Accordingly, embodiments may provide a first NULL block at the beginning of a preamble sequence and a second NULL block at the end of the preamble sequence. Such NULL blocks may provide guard band features.

Modulation module 104 may receive preamble sequences from preamble module 102 and modulate them according to OFDM techniques to produce a modulated signal. These modulation techniques may involve various operations, such as performing Inverse Fast Fourier Transforms (IFFTs) on received preamble sequences.

For instance, FIG. 1 shows modulation module 104 receiving preamble sequence 120 and producing a corresponding modulated preamble signal 122. In embodiments, this signal is included in a single OFDM symbol. Modulated preamble signal 122 may be transmitted across communications networks (e.g., wireless networks) to one or more remote devices. For instance, modulated signal 122 may be transmitted across a WiMAX or WiMAX II network. Upon receipt, the remote device(s) may demodulate this signal, detect the corresponding preamble sequence and perform various operations with it. For example, the remote device(s) may use the detected preamble to obtain timing synchronization, estimate frequency offsets, detect a preamble index, perform channel estimation, and/or derive other system information. The embodiments, however, are not limited to these examples.

Embodiments may employ preamble sequences having a length of 512. Such preamble sequences, reading from left to right (or from subcarrier 0 to subcarrier 511) may include 46 zeros, 210 arbitrary values, one zero (for the DC subcarrier), 210 arbitrary values, and 45 zeros.

The frequency domain OFDM symbol structure of such sequences is provided below in Table 1.

The design technique for the structure of Table 1 is based on differential encoding of Hadamard matrices, such as Sylvester matrices (which are a sub-class of Hadamard matrices), for which methods of fast correlation computation may be performed.

Examples are now provided of preamble sequences in accordance with Table 1. As described above, these preamble sequences may be based on Hadamard matrices (such as Sylvester matrices). Accordingly, before describing the generation of such preamble sequences, the construction of Sylvester Matrices is first described. Let a Sylvester matrix $H_2$ be defined as:

$$H_2 = \begin{pmatrix} 1 & 1 \\ 1 & -1 \end{pmatrix}$$

For any $m \geq 2$, $H_2$ is defined recursively as, $$H_{2^m} = \begin{pmatrix} H_{2^{m-1}} & H_{2^{m-1}} \\ H_{2^{m-1}} & -H_{2^{m-1}} \end{pmatrix}.$$

TABLE 1

| Block Name | Subcarriers | Description |
|---|---|---|
| Null Block | 0-45 | The 46 left most subcarriers (0-45) are nulled. |
| $A_1$ | 46-79 | 34 subcarriers (46-79) containing frequency domain signals $a_{0,1}, 0, a_{1,1}, 0, \ldots, a_{15,1}, 0, a_{16,1}, 0$, respectively. |
| $B_1$ | 80-99 | 20 subcarriers (80-99) |
| $A_2$ | 100-133 | 34 subcarriers (100-133) containing frequency domain signals $a_{0,2}, 0, a_{1,2}, 0, \ldots, a_{15,2}, 0, a_{16,2}, 0$, respectively. |
| $B_2$ | 134-153 | 20 subcarriers (134-153) |
| $A_3$ | 154-187 | 34 subcarriers (154-187) containing frequency domain signals $a_{0,3}, 0, a_{1,3}, 0, \ldots, a_{15,3}, 0, a_{16,3}, 0$, respectively. |
| $B_3$ | 188-207 | 20 subcarriers (188-207) |
| $A_4$ | 208-241 | 34 subcarriers (208-241) containing frequency domain signals $a_{0,4}, 0, a_{1,4}, 0, \ldots, a_{15,4}, 0, a_{16,4}, 0$, respectively. |
| $B_4$ | 242-269 | 28 subcarriers (242-269) |
| $A_5$ | 270-303 | 34 subcarriers (270-303) containing frequency domain signals $a_{0,5}, 0, a_{1,5}, 0, \ldots, a_{15,5}, 0, a_{16,5}, 0$, respectively. |
| $B_5$ | 304-323 | 20 subcarriers (304-323) |
| $A_6$ | 324-357 | 34 subcarriers (358-377) containing frequency domain signals $a_{0,6}, 0, a_{1,6}, 0, \ldots, a_{15,6}, 0, a_{16,6}, 0$, respectively. |
| $B_6$ | 358-377 | 20 subcarriers (358-377) |
| $A_7$ | 378-411 | 34 subcarriers (378-411) containing frequency domain signals $a_{0,7}, 0, a_{1,7}, 0, \ldots, a_{15,7}, 0, a_{16,7}, 0$, respectively. |
| $B_7$ | 412-431 | 20 subcarriers (412-431) |
| $A_8$ | 432-465 | 34 subcarriers (432-465) containing frequency domain signals $a_{0,8}, 0, a_{1,8}, 0, \ldots, a_{15,8}, 0, a_{16,8}, 0$, respectively. |
| Null Block | 466-511 | The 46 rightmost subcarriers (466-511) are nulled. |

The structure indicated above in Table 1 includes blocks $A_1, A_2, A_3, A_4, A_5, A_6, A_7,$ and $A_8$ (collectively referred to as "A blocks"). Also, the structure indicated in Table 1 includes blocks $B_1, B_2, B_3, B_4, B_5, B_6,$ and $B_7$ (collectively referred to as "B blocks").

This structure interleaves null subcarriers (i.e., every other subcarrier is a null subcarrier). For instance, odd subcarriers in the B blocks are nulled. This feature provides important time domain implications. More particularly, this interleaving of null subcarriers provides corresponding time domain OFDM signals having their first halves equal to their second halves. As a result, the known Schmidl-Cox algorithm can be applied for initial time and frequency offset estimation.

$H_{2^m}$, as expressed above, is called the Sylvester matrix of dimension $2^m$. Preamble sequences in accordance with Table 1 are constructed differentially from $H_{128}$ according to techniques described below.

As described above, the preamble sequence of Table 1 includes eight A blocks ($A_1, A_2, A_3, A_4, A_5, A_6, A_7, A_8$). Population of these blocks is now described.

Each A block has a length of 34. Further, every other subcarrier in each A block is a null subcarrier. Thus, for each block $A_i$, where $i=1, 2, \ldots, 8$, only the following values need to be identified: $a_{0,i}, 0, a_{1,i}, 0, \ldots, a_{15,i}, 0, a_{16,i}, 0$.

In embodiments, 128 preamble sequences (indexed by $i=1, 2, \ldots, 128$) are constructed differentially (through differential encoding) respectively from rows i=1, 2, ..., 128 of $H_{128}$. Each row of $H_{128}$ is a sequence of length 128 which may be thought of as eight consecutive blocks of length 16 sequences.

Considering an arbitrary row i ($1 \leq i \leq 128$) of $H_{128}$, and denoting it by $b_1, b_2, \ldots, b_{128}$, a corresponding 8 blocks of length 16 respectively are provided. These blocks may be expressed as $b_1, b_2, \ldots b_{16}, b_{17}, b_{18}, \ldots, b_{32}, \ldots, b_{113}, b_{114}, \ldots, b_{128}$.

In embodiments, blocks $A_1, A_2, A_3, A_4, A_5, A_6, A_7, A_8$ are respectively constructed by scrambling the differentially encoded versions of $b_1, b_2, \ldots, b_{16}, b_{17}, b_{18}, \ldots, b_{32}, b_{113}, b_{114}, \ldots, b_{128}$ by fixed binary scrambling sequences $S_1, S_2, \ldots, S_8$. The scrambling sequences $S_1, S_2, \ldots, S_8$ are all of length 17. In other words $S_i = s_{0,i}, s_{1,i}, \ldots, s_{15,i}, s_{16,i}$, for i=1, 2, ..., 8, where $S_{j,i} \in \{-1, 1\}$ for $0 \leq j \leq 16$. In embodiments, these scrambling sequences $S_1, S_2, \ldots, S_8$ are respectively given by the rows 1, 2, ..., 8 of the following matrix:

$$\begin{pmatrix} -1 & 1 & 1 & 1 & -1 & -1 & 1 & 1 & 1 & 1 & -1 & -1 & -1 & -1 & -1 & 1 & -1 \\ 1 & 1 & 1 & 1 & 1 & -1 & 1 & 1 & -1 & -1 & 1 & -1 & -1 & -1 & -1 & -1 & 1 \\ -1 & -1 & -1 & -1 & 1 & 1 & -1 & -1 & 1 & -1 & -1 & -1 & -1 & -1 & -1 & 1 & -1 \\ 1 & 1 & -1 & -1 & 1 & -1 & 1 & 1 & 1 & 1 & -1 & -1 & -1 & -1 & -1 & -1 & 1 \\ -1 & 1 & 1 & -1 & -1 & 1 & 1 & 1 & 1 & -1 & -1 & -1 & 1 & -1 & -1 & 1 & 1 \\ -1 & 1 & -1 & 1 & -1 & 1 & -1 & 1 & 1 & 1 & -1 & -1 & 1 & -1 & 1 & 1 & 1 \\ 1 & 1 & -1 & -1 & 1 & -1 & 1 & 1 & 1 & -1 & 1 & -1 & -1 & 1 & -1 & 1 & 1 \\ 1 & 1 & 1 & 1 & -1 & -1 & -1 & 1 & 1 & -1 & 1 & 1 & -1 & 1 & 1 & -1 & 1 \end{pmatrix}$$

For purposes of illustration, the encoding of $A_1$ and $A_2$ respectively using $b_1, b_2, \ldots, b_{16}$ and $b_{17}, b_{18}, \ldots, b_{32}$, and the scrambling sequences $S_1$ and $S_2$ are now described. The encoding of $A_3, A_4, A_5, A_6, A_7$ and $A_8$ are analogous.

The encoding of block $A_1$ involves $C_i$, and $D_i$. This encoding begins by setting $C_0 = 1$. From this, values of $C_i$ for i=1, 2, ..., 16 are generated through differential encoding as:

$C_i = C_{i-1} b_i$, i=1, 2, ..., 16.

Further, values of $D_i$ are generated as:

$D_i = C_i s_{i,1}$, i=0, 1, ..., 16.

As a result, block $A_1$ is then populated by $D_0, D_1, \ldots, D_{16}$.

In a similar manner, the encoding of block $A_2$ involves $C_i$, and $D_i$. This encoding begins by setting $C_{17} = 1$. From this, values of $C_i$ for i=18, 19, ..., 33 are generated as:

$C_i = C_{i-1} b_{i-1}$, i=18, 19, ..., 33.

Further, values of $D_i$ are generated as:

$D_i = C_i s_{i-17,2}$, i=17, 18, ..., 33.

As a result, block $A_2$ is then populated by $D_{17}, D_{18}, \ldots, D_{33}$.

The scrambling sequences $S_1, S_2, \ldots, S_8$ employed in the generation of A blocks serve two purposes. First, the scrambling sequences control the PAPR of the above preamble sequences. Second, the scrambling sequences make the preamble sequences look random. Accordingly, the scrambling sequences of the matrix shown above were selected using a computer search. This search ensures that the PAPRs of all the constructed preamble sequences (corresponding to scrambled versions of rows 1, 2, ..., 128 of $H_{128}$) are all low (e.g., less than 8.3 dB) and that the preamble sequences look random. It is worthy to note this scrambling is common to all A blocks.

As described above, the preamble sequence of Table 1 includes seven B blocks ($B_1, B_2, B_3, B_4, B_5, B_6, B_7$). Population of these blocks is now described.

The B blocks may be populated according to different techniques. For instance, a first technique involves populating blocks $B_1, B_2, \ldots, B_7$ with all null subcarriers. Through this technique, these blocks serve as guard bands. In the context of WiMAX and WiMAX II environments, these guard bands may be employed because each access terminal may have different frequency offsets from the base-stations of the neighboring cells. Accordingly, the existence of these null subcarriers may improve the probability of preamble detection by access terminals.

A second technique for populating the B blocks involves the insertion of random values. For instance, blocks $B_1, B_2, B_3, B_5, B_6, B_7$ (each of which have a length of 20) may each be populated according to the form:

$z_1, 0, z_2, 0, \ldots, z_{10}, 0$, where $z_1, z_2, \ldots, z_{10}$ is a random ±1 sequence.

Further, according to this second technique, block $B_4$ (having a length of 28) may be populated according to the form:

$z_1, 0, z_2, 0, \ldots, z_6, 0, z_7, 0, 0, 0, z_8, 0, \ldots z_{13}, 0$, where $z_1, z_2, \ldots, z_{13}$ is a random ±1 sequence.

Thus, this population technique assures that subcarrier 256 (the DC subcarrier) is nulled. For each differential Sylvester preamble number 1, 2, ..., 128, these random blocks may be optimized (by a random search) such that the PAPR of the constructed sequence is low. It is evident from the above description that each preamble having B blocks populated according to the second technique has 209 non-zero subcarriers.

The first and second techniques for populating B blocks may be suitable for different situations. For instance, as described above, the first technique (which populates blocks $B_1, B_2, \ldots B_7$ with all null subcarriers) allows B Blocks to serve as guard bands.

However, following an acquisition process, a device may desire to obtain channel estimation from preamble sequences. In such situations, preambles having B blocks populated according to the second technique (having random inserted values) may improve channel estimation quality. The extent of such improvements may depend on trade-offs between channel estimation quality, detection probability, and PAPR. However, preambles having B blocks populated according to the second technique, may increase channel estimation quality and reduce the PAPR of all sequences.

Despite the differences regarding these techniques, preambles populated according to either of these techniques are amenable to the same fast detection and time and frequency offset estimation algorithms.

In wireless communications, transmitted signals are distorted in their media of transmission (e.g., a wireless channel). To receive signals accurately, a receiving device may use knowledge of the channel (obtained or estimated via known methods) and perform a coherent detection. Alternatively, when the receiving device has no knowledge of the channel, it can assume that channel effects on the adjacent elements of preamble sequences are approximately equal. This allows for the use of differential detection techniques and/or algorithms as described herein.

Embodiments provide techniques (e.g., differential detection techniques) for the detection of preamble sequences. Through such techniques, preambles may be advantageously detected using a reduced number of calculations. As a result, preambles may be detected in less time.

With reference to the preambles described above, such detection techniques may involve calculating, for each length 34 block $A_j$, $j=1, 2, \ldots, 8$, a detection metric having a length of 16. This detection metric is expressed as $M_j[i]$, where $j=1, 2, \ldots, 16$, and $i=1, 2, \ldots, 16$.

This generation of detection metrics involves sequences $R[i]$ which convey received preamble values (also referred to as received words). For instance, $R[i]$ (where $i=1, 2, \ldots, 17$) and $R[i]$ (where $i=18, 19, \ldots, 34$) respectively denote the frequency domain received words corresponding to non-zero subcarriers of $A_1$ (i.e. subcarriers 46, 48, 50, ..., 78) and the non-zero subcarriers of $A_2$ (i.e. subcarriers 100, 102, ..., 132).

For each block, $M_j[i]$ is computed. As described above, each of these metrics is a sequence of length 16. $M_1[i]$ is computed for $A_1$ and $M_2[i]$ is computed for $A_2$ according to the following expressions.

$$M_1[i]=R[i] \cdot s_{i,1} \cdot R[i+1]^* s_{i+1,1}, i=1, 2, \ldots, 16; \text{ and}$$

$$M_2[i-17]=R[i-17] \cdot s_{i-17,2} \cdot R[i-16]^* s_{i-16,2}, i=18, 19, \ldots, 33.$$

In a like manner, $M_j[i]$ may be constructed for $A_3$, $A_4$, $A_5$, $A_6$, $A_7$, and $A_8$.

The above expressions indicate that metrics $M_j[i]$ are obtained by de-scrambling the received words and correlating (differentially decoding) the consecutive de-scrambled words. These descrambling and correlating operations are similar to the correlating and scrambling operations described above in the generation of A blocks.

Based on an assumption that the communications channel is frequency flat across the A blocks, and utilizing the fact that the preambles described herein are real vectors, further operations may be performed, as described below.

For instance, upon calculation of metrics $M_j[i]$, a vector $R_1$ may be constructed, which is indicated below as:

$$R_1=M_1[1], \ldots M_1[16], M_2[1], \ldots M_2[16], M_3[1], \ldots M_3[16], \ldots M_8[1], M_8[16].$$

From $R_1$, a preamble index may be determined that corresponds to the received preamble values. This determination may involve obtaining the real parts of vector $R_1$, which are expressed as $\Re(R_1)$. More particularly, $\Re(R_1)$ may be obtained respectively from vector $R_1$ by applying the real part operator $\Re(.)$ in a component wise manner.

Upon obtaining the real parts of vector $R_1$, row(s) $i_1$ of $H_{128}$ are detected that have the highest correlation with $\Re(R_1)$. Thus, the preamble index $i_1$ may be detected. When using the preamble sequence format of Table 1, the computation of vectors $\Re(R_1)$ requires 256 real multiplication and 128 additions. Thus, a preamble sequence may be detected by determining correlations between metrics (e.g., $\Re(R_1)$) based on a received sequence of values and each row the matrix used in generating the corresponding set of preamble sequences (e.g., $H_{128}$). Based on these correlations, the detected preamble sequence may be selected. For example, the preamble sequence corresponding to the greatest correlation value may be selected.

A fast algorithm that computes the correlations of all the rows of $H_{128}$ with $\Re(R_1)$ is now described. Correlations of all the rows of $H_{128}$ with $\Re(R_1)$ may be expressed with reference to a real vector $X=(x_1, x_2, \ldots, x_{128})$. Thus, computing the correlations of all rows of $H_{128}$ with $X=(x_1, x_2, \ldots, x_{128})$ amounts to computing the product $H_{128}X^T$.

Let $I_2$ denote the 2×2 identity matrix. For $i=1, 2, \ldots 7$, let $U_i=I_2 \otimes I_2 \otimes \ldots I_2 \otimes H_2 \otimes I_2 \otimes \ldots \otimes I_2$ where $H_2$ appears in the i-th position (from the left). From this, it follows that:

$$H_{128}=U_7 U_6 \ldots U_1.$$

Thus, the following recursive correlation operation may be performed:

$$H_{128}X^T=U_7(U_6( \ldots U_2(U_1X^T)) \ldots ).$$

This operation involves a recursive calculation of the following products:

$$U_1X^T, U_2(U_1X^T), \ldots, U_7(U_6( \ldots U_2(U_1X^T)) \ldots )$$

Thus, this operation requires seven multiplication stages, where each stage consists of 128 real additions (subtractions are counted as additions). Accordingly, the computation of $H_{128}X^T$ requires 7*128=896 real additions.

It follows from the above description that, for the preamble sequence format of Table 1, the differential detector may implement an entire detection algorithm with 8*128=1024 real additions and 256 real multiplications. This gives a reduction of two orders of magnitude compared to currently employed WiMAX preamble detection techniques.

When B blocks of a preamble are populated with randomized values (the aforementioned second technique for B block population), additional information is conveyed in the preamble. As a result of such additional information, a device receiving such preambles may experience improved preamble detection probabilities.

For example, a full differential detection technique may be employed that treats the B blocks containing randomly generated values as differentially encoded versions of appropriate sequences. However, performing full differential detection for all 128 preamble sequences disclosed above may be computationally expensive.

Thus, embodiments may employ a two-stage sub-optimal detection approach. Such two-stage approaches may be employed, for example, with preamble sequences having B blocks that contain randomly generated values.

According to such two-stage approaches, the detection techniques described above are first performed in a first stage. As described above, such techniques involve the calculation of metrics $M_j[i]$ from a received sequence, the construction of a vector $R_1$, and correlation operations that employ recursive calculations. This produces a short list of a small size m (e.g., m=2 or m=3) of preamble candidates with highest detection metric values. These candidates are also referred to as the most likely candidates.

Then, in a second stage, full correlation operations are performed between the received sequence and these most likely candidates. These full correlations involve both A blocks and B blocks of the received sequence. As described above, this may increase preamble detection probabilities. From these correlations, a best candidate (the candidate having the greatest correlation result) is detected from the most likely candidates.

The second stage only adds slight complexity to the first stage. However, it may provide performance that may be very close to full differential detection.

Figure 2:
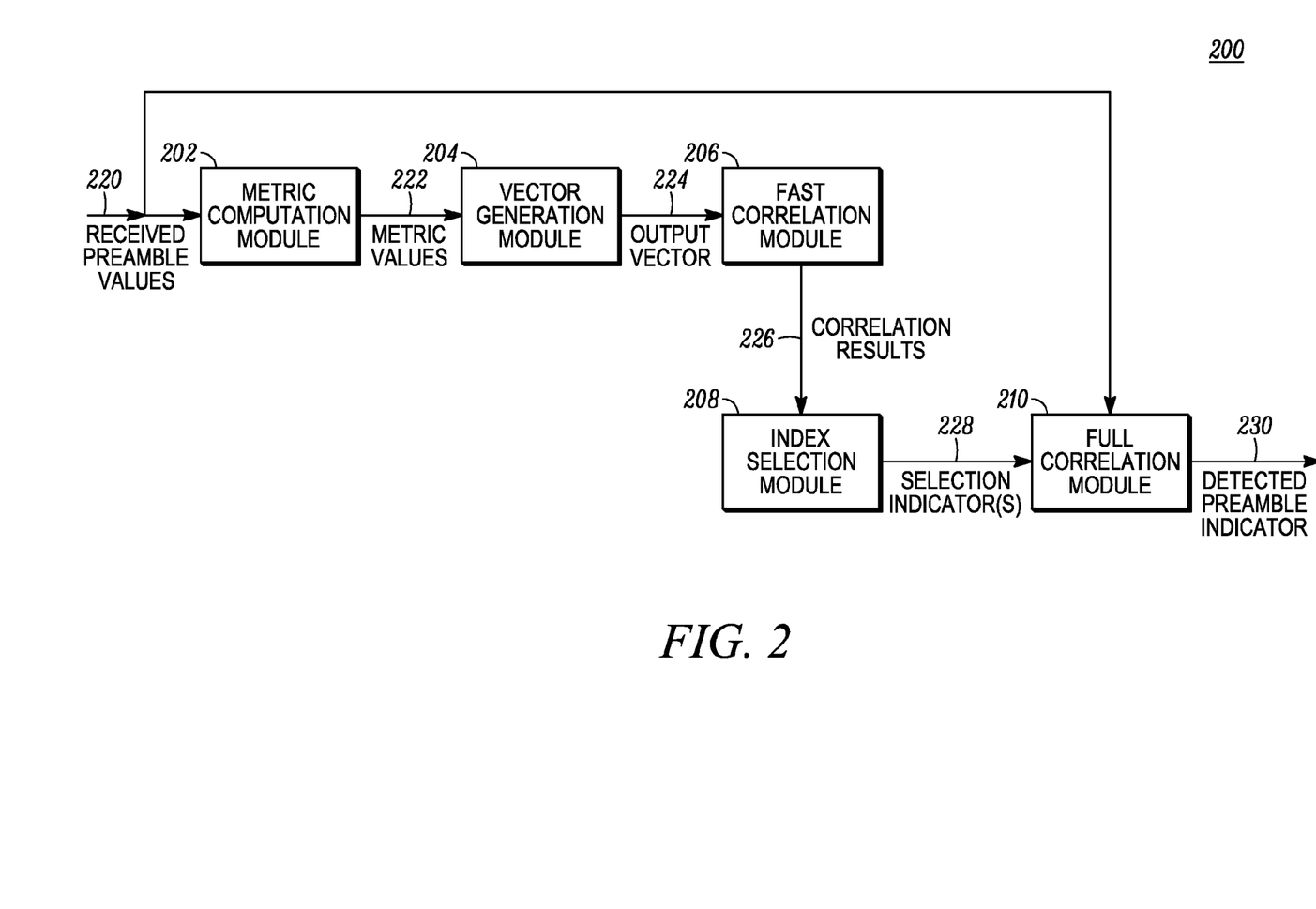

The two-stage detection approach may be implemented in various ways. An exemplary apparatus that may employ this approach is provided in FIG. 2. In particular, FIG. 2 is a diagram of an apparatus 200 that may receive and process preamble sequences. Apparatus 200 may comprise various elements. For instance, FIG. 2 shows that apparatus 200 may include a metric computation module 202, a vector generation module 204, a fast correlation module 206, an index selection module 208, and a full correlation module 210. The embodiments, however, are not limited to these depicted elements. The elements of apparatus 200 may be implemented in hardware, software, firmware, or any combination thereof.

FIG. 2 shows that metric computation module 202 obtains received preamble values 220. These values may represent an OFDM demodulated preamble signal that is received wirelessly from a remote device. Thus, received preamble values 220 may correspond to a preamble sequence generated according to the techniques described herein. As such received preamble values 220 may include portions corresponding to A blocks, and portions corresponding to B blocks.

Based on received preamble values 220, metric computation module 202 calculates a plurality of metric values 222. For example, metric computation module 202 may calculate metrics $M_j[i]$, as described above. These metrics are based on values corresponding to a preamble's A blocks.

As shown in FIG. 2, metric values 222 are sent to vector generation module 204. In turn, vector generation module 204 combines these values into a vector, such as $R_1$. Additionally, as described above, vector generation module 204 may obtain the real part of this vector. Thus, vector generation module 204 may produce $\Re(R_1)$. In turn, $\Re(R_1)$ may be sent to fast correlation module 206 as an output vector 224.

Fast correlation module 206 performs correlation operations between output vector 224 and all the rows of a matrix used in generating the preamble sequence (also referred to as the generation matrix) corresponding to output vector 224. As described above, this matrix may be a Hadamard matrix (e.g., a 128×128 Sylvester matrix). In embodiments, these correlation operations may involve performing the recursive calculation techniques described above.

As a result of these correlation operations, fast correlation module 206 produces a correlation value for each row of the generation matrix. These values are provided to index selection module 208 as correlation results 226.

Based on correlation results 226, index selection module 208 may select multiple rows (e.g., 2 or 3 rows) of the generation matrix. This may involve selecting the rows corresponding to the highest values in correlation results 226. Thus, index selection module 208 selects most likely preamble sequence candidates. FIG. 2 shows that such selections are sent to full correlation module 210 as selection indicators 228. Each such indicator may be in the form of a row number or sequence index.

In addition to receiving selection indicators 228, full correlation module 210 also receives received preamble values 220. Accordingly, module 210 performs full correlations between received preamble values 220 and the full preamble sequences identified by selection indicators 228. As described above, such full correlations involve both A blocks and B blocks of received preamble values 220. As a result of these correlations, full correlation module 210 identifies a best preamble candidate and indicates this best candidate with a detected preamble indicator 230. Detected preamble indicator 230 may be in the form of a row number or sequence index.

Figure 3:
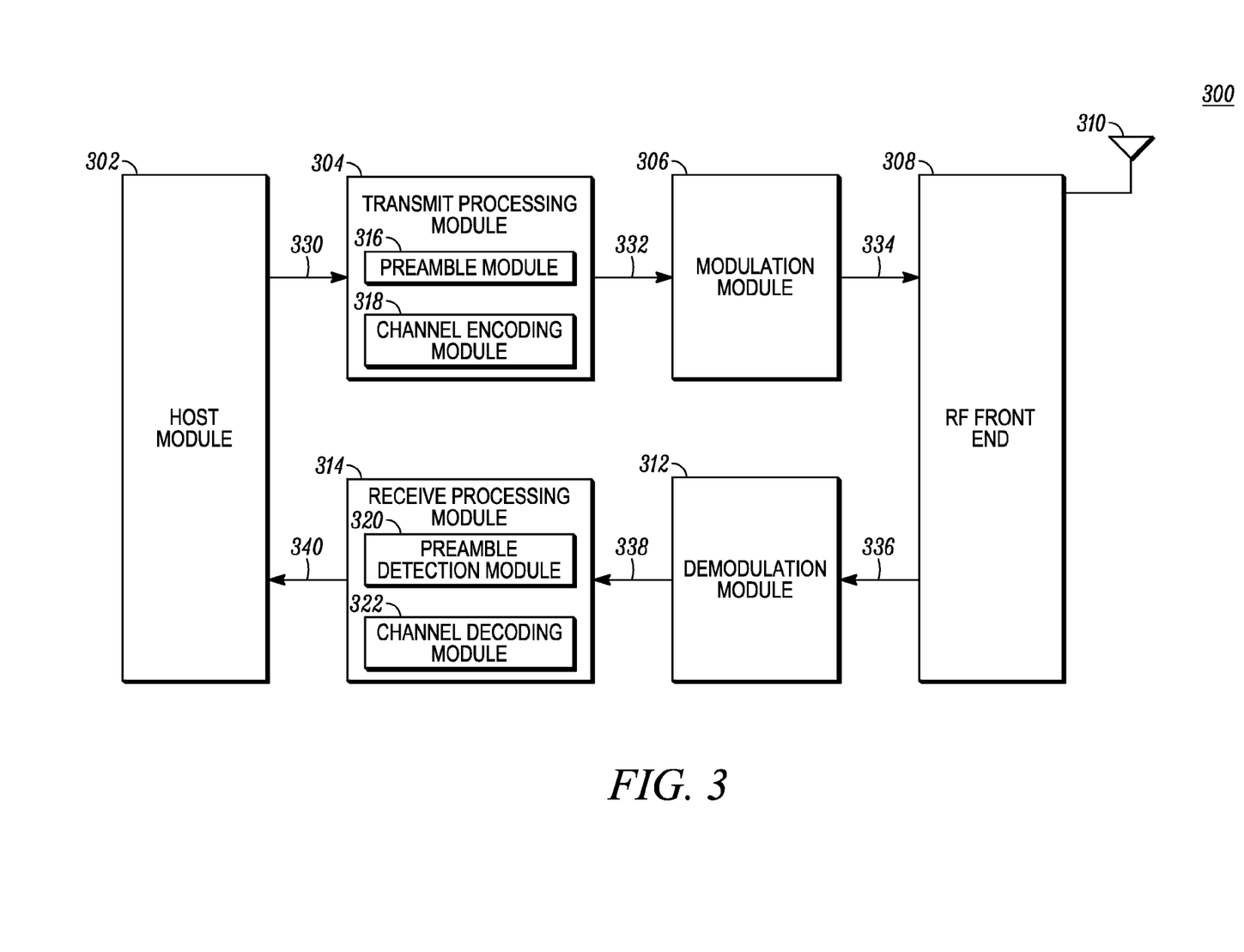
FIG. 3 is a diagram of a further exemplary implementation.

FIG. 3 is a diagram showing an exemplary implementation 300 that may be employed in various devices, such as WiMAX and/or WiMAX II devices. The embodiments, however, are not limited to such devices. As shown in FIG. 3, implementation 300 includes both preamble transmission and preamble detection features. However, in embodiments, implementations may include only preamble transmission features or preamble detection features, as may be required for operation in certain networks.

Implementation 300 may include various elements. For instance, FIG. 3 shows implementation 300 including a host module 302, a transmit processing module 304, a modulation module 306, a radio frequency (RF) front end 308, and an antenna 310. In addition, implementation 300 may include a demodulation module 312 and a receive processing module 314. However, the embodiments are not limited to these depicted elements. Moreover, the elements of FIG. 3 may be implemented in hardware, software, firmware, or any combination thereof.

Host module 302 may send and receive information that is exchanged with remote devices. Accordingly, host module 302 may include components and/or functionality to operate according to one or more protocol layers. Such protocol layers may provide features, such as signaling, link protocols, media access protocols, and/or higher level protocols. However, host module 302 may include other components and/or functionality. In turn, host module 302 may exchange information (e.g., payload data) with higher level protocols and/or application entities (not shown).

For instance, FIG. 3 shows host module 302 sending an information sequence 330 to transmit processing module 304. Information sequence 330 may include, for example, payload data and/or control information. However, this sequence may include other forms of information.

As shown in FIG. 3, transmit processing module 304 may include a preamble module 316 and a channel encoding module 318. Channel encoding module 318 performs various operations on information sequence 330. Such operations may include randomizing, forward error correction (FEC) encoding, and/or interleaving operations. Further, upon performing these operations, channel encoding module 318 may map the processed sequence to particular subcarriers. This results in a mapped signal (e.g., a mapped quadrature amplitude modulation (QAM) signal or a mapped phase shift keying (PSK) signal).

Preamble module 316 may be implemented as preamble module 102 of FIG. 1. Accordingly, preamble module 316 provides a preamble sequence as described herein. In providing this sequence, preamble module 316 may select from among multiple stored preambles. For example, preamble module 316 may select from preamble sequences having the format provided above in Table 1.

FIG. 3 shows that transmit processing module 304 provides a signal 332 to modulation module 306. Signal 332 may comprise the preamble sequence provided by preamble module 316. In addition, signal 332 may comprise the processed and mapped information sequence generated by channel encoding module 318. These may be included, for example, within a transmission packet.

Modulation module 306 receives signal 332 and performs OFDM modulation on it. This may performed one OFDM symbol at a time. In embodiments, the preamble sequence may be represented by an individual OFDM symbol. As described above, OFDM modulation involves the performance of IFFTs. In addition, modulation module 306 may perform further operations, such as a digital to analog conversion of a modulated digital signal. FIG. 3 shows that these operations produce a modulated signal 334, which is sent to RF front end 308.

RF front end 308 exchanges signals between antenna 310, and modules 306 and 312. In particular, RF front end 308 prepares modulated signal 334 for wireless transmission. In turn, the signal is transmitted wirelessly via antenna 310. In addition, RF front end 308 prepares wireless signals received via antenna 310 for modules 312 and 314. RF front end 308 may include various components (e.g., electronics) such as amplifiers, filters, upconverters, downconverters, diplexers, and/or circulators. The embodiments, however, are not limited to these examples.

As shown in FIG. 3, RF front end 308 may provide a received signal 336 to demodulation module 312. Upon receipt, demodulation module 312 may perform various operations. For example, demodulation module 312 may perform an analog to digital conversion of received signal 336 and then perform OFDM demodulation on this signal. Such OFDM demodulation involves the performance of Fast Fourier Transforms (FFTs). FIG. 3 shows that these operations produce a demodulated signal 338, which is sent to receive processing module 314.

As shown in FIG. 3, receive processing module 314 may include a preamble detection module 320 and a channel decoding module 322. Preamble detection module 320 may comprise apparatus 200 of FIG. 2. Accordingly, preamble detection module 320 may perform two-stage preamble detection operations, as described herein.

Channel decoding module 322 performs various operations on non-preamble portions demodulated signal 338. For instance, channel decoding module 322 may de-map such portions of signal 338 into symbols. Also, channel decoding module 322 may perform various operations on these symbols, such as de-interleaving, FEC decoding, and/or derandomizing. The embodiments, however, are not limited to these operations.

As a result of such operations, receive processing module 314 produces an information sequence 340, which is sent to host module 302.

For purposes of illustration (and not limitation), FIG. 3 shows implementation 300 including a single antenna (310). The embodiments, however, are not limited to this number. In fact, any number of antennas may be employed. Through such antennas, wireless signals may be exchanged with remote devices.

It is stated above that some implementations may include only preamble transmission features and other implementations may include only preamble detection features, as may be required for operation in certain networks. Thus, implementations that only transmit preambles may omit preamble detection module 320. In contrast, implementations that only receive preambles may omit preamble module 316. However, implementations may include both preamble transmission features and preamble detection features.

Also, it is stated above that the elements of FIGS. 1, 2, and 3 may be implemented in hardware, software, firmware, or any combination thereof. Thus, implementations may include one or more processors that execute instructions or control logic stored in a storage medium (e.g., memory). Moreover, preamble module 102 may include a storage medium to store preamble sequences. However, embodiments are not limited to these exemplary usages of storage media.

Such storage media may be implemented in various ways. For example, such storage media may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

Embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 4:
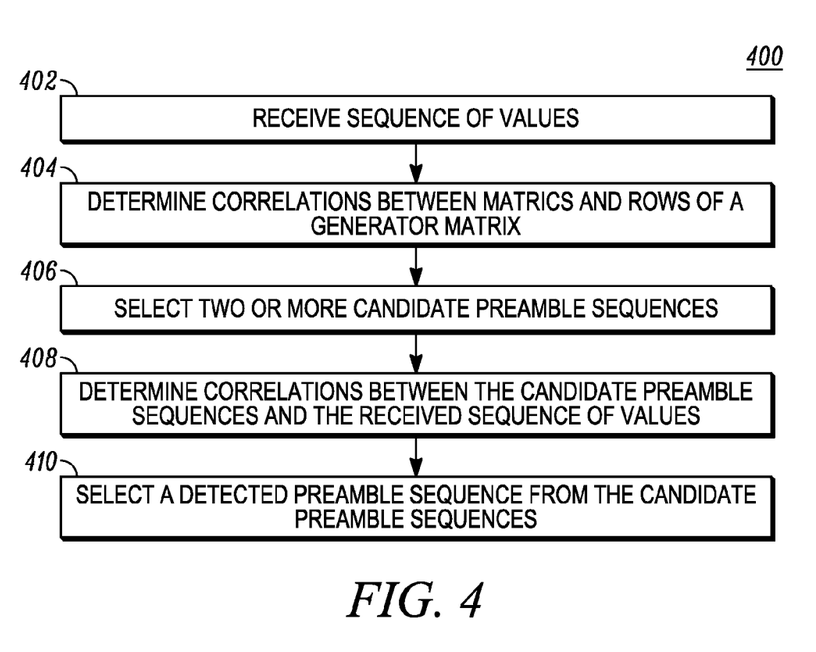
FIGS. 4 and 5 illustrate exemplary logic flows.

FIG. 4 illustrates an exemplary logic flow 400 involving preamble detection. This flow may be representative of the operations executed by one or more embodiments described herein. Although FIG. 4 shows a particular sequence, other sequences may be employed. Also, the depicted operations may be performed in various parallel and/or sequential combinations. Furthermore, while examples of this flow are provided in the context of FIG. 2, the embodiments are not limited to this context.

As shown in FIG. 4, a sequence of values is received at a block 402. These values may be from a demodulated OFDM symbol. At a block 404, correlations are determined between each row of a generator matrix and metrics based on a plurality of values (e.g., the A blocks) in the received sequence. Accordingly, block 404 may involve calculating $R(R_1)$, and correlating it with the generator matrix, as described above. In the context of FIG. 2, block 404 may be implemented with modules 202, 204, and 206.

At a block 406, two or more candidate preamble sequences are selected. This selection is from a plurality of preamble sequences and is based on correspondences between the plurality of values in the received sequence and rows of a generator matrix (e.g., the correlations determined at block 404). With reference to FIG. 2, this may be performed by index selection module 208.

FIG. 4 shows that, at a block 408, correlations are determined between the sequence of values received at block 402 and the two or more candidate preamble sequences. Further, at a block 410, a detected preamble sequence is selected from the two or more candidate preamble sequences. This detected preamble sequence has a greatest correlation of the correlations determined at block 408. Referring again to FIG. 2, blocks 408 and 410 may be performed by full correlation module 210.

Figure 5:
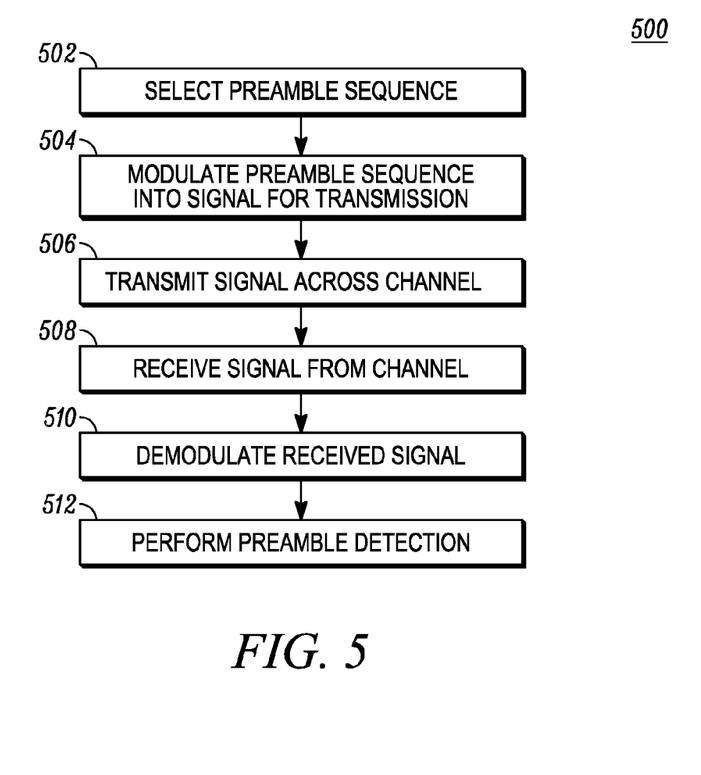

FIG. 5 illustrates a further exemplary logic flow 500. This logic flow may be representative of the operations executed by one or more embodiments described herein. Although FIG. 5 shows a particular sequence, other sequences may be employed. Also, the depicted operations may be performed in various parallel and/or sequential combinations. Furthermore, while examples of this flow are provided in the context of FIG. 3, the embodiments are not limited to this context.

The flow of FIG. 5 involves the transmission of a preamble from a first device to a second device. For example, the first device may be a WiMAX or WiMAX II base station and the second device may be a mobile device. The embodiments, however, are not limited to these types of devices or to WiMAX or WiMAX II networks.

Moreover, the first and second devices may each include the implementation of FIG. 3. Alternatively, these devices may employ similar implementations. For instance, in embodiments, the first device may not include preamble detection module 320. Also, in embodiments, the second device may not include preamble module 316. However, the embodiments are not limited to these exemplary implementations.

As shown in FIG. 5, logic flow 500 includes a block 502. At this block, the first device selects a preamble sequence. This may involve selecting the preamble sequence from among multiple sequences, such as the 128 sequences described above having the format of Table 1. Thus, each of these multiple preamble sequences may correspond to a respective row of a Hadamard matrix. Further, each of these preamble sequences may include multiple blocks of values based on differentially encoded and scrambled values of the corresponding Hadamard matrix row. With reference to FIG. 3 (or a similar implementation), block 502 may be performed by preamble module 316.

At a block 504, the first device modulates the preamble and generates a corresponding preamble signal. The preamble signal may be in the form of a single OFDM symbol. Block 504 may be performed, for example, by modulation module 306.

FIG. 5 shows that at a block 506, the modulated preamble signal is transmitted across a wireless channel. Then, at a block 508, the second device receives the modulated preamble signal.

At a block 510, the second device demodulates the preamble signal to produce a demodulated sequence of values. Following this demodulation, a block 512 may perform preamble detection. This preamble detection may involve two-stage detection techniques, such as the exemplary technique of FIG. 4.

Alternatively, the preamble detection of block 512 may involve single-stage detection techniques. For instance, as described herein, this may involve determining correlations between metrics (e.g., $\Re(R_1)$) based on the demodulated sequence of values and each row of the matrix used in generating the corresponding set of preamble sequences. Based on these correlations, the detected preamble sequence may be selected. For example, the preamble sequence corresponding to the greatest correlation value may be selected. The embodiments, however, are not limited to these exemplary two-stage and single-stage detection techniques. For instance, embodiments may employ full-differential techniques that operate on, for example, A blocks and B blocks. Such techniques may be performed in a single-stage.

In embodiments where the second device employs the implementation of FIG. 3 (or similar implementations), this demodulation may be performed by demodulation module 312 and the preamble detection may be performed by preamble detection module 320.

Table 2, below, provides parameters for computer simulations that evaluate the preambles described herein. In particular, this evaluation involved a computer simulation of a WiMax 802.16e type platform.

TABLE 2

| | |
|---|---|
| FFT size | 512 |
| Number of active subcarriers | 420 |
| Guard Interval (GI) | 64 samples |
| Frame duration | 20 ms |
| Number of preamble symbols in a frame | 1 |
| Channel model | Exponential with delay spread = GI |
| Time synchronization method | Autocorrelation |

As shown in Table 2, the simulated platform employed a Fast Fourier Transform (FFT) of size 512 to perform OFDM demodulation. Results of these simulations are described below with reference to FIGS. 6 and 7.

Figure 6:
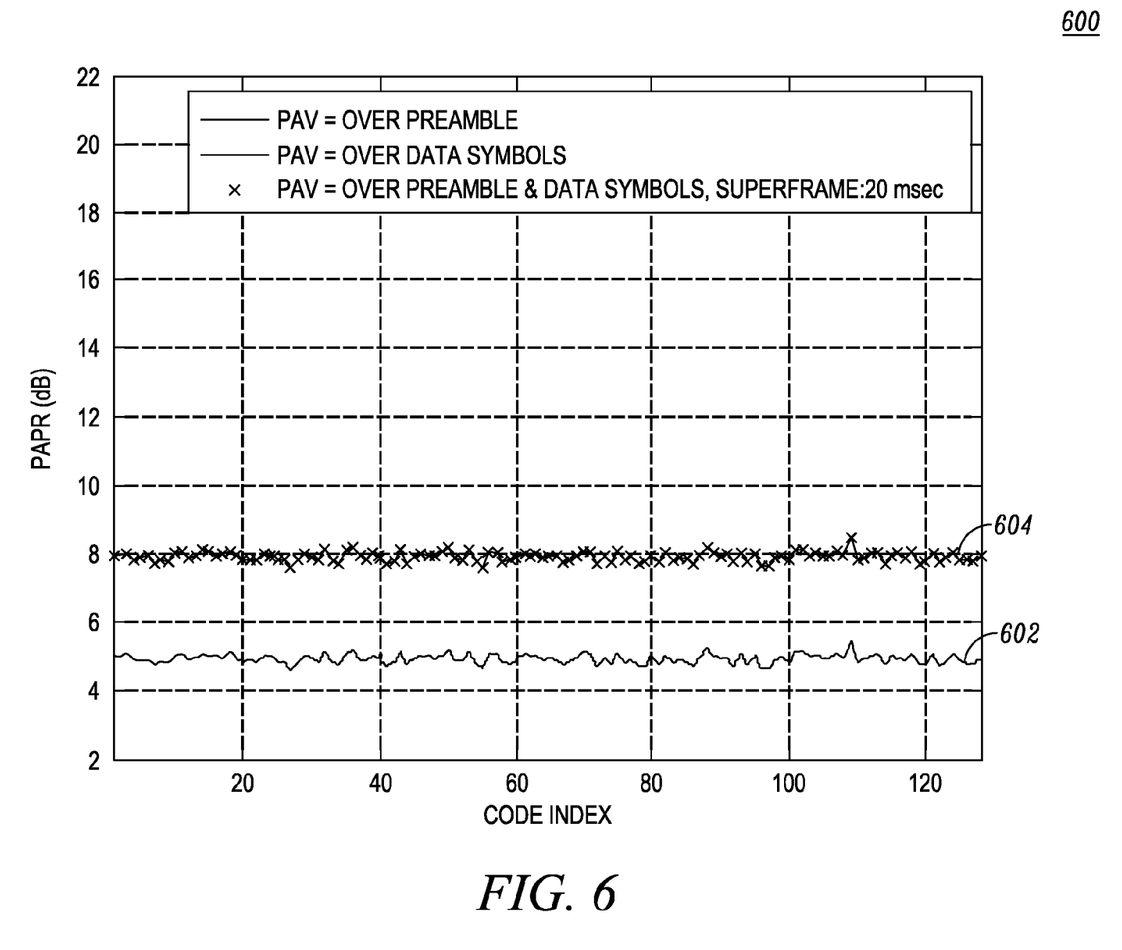
FIGS. 6 and 7 are graphs showing illustrative performance characteristics.

FIG. 6 is a graph 600 showing the PAPR versus preamble index for 128 preamble sequences generated according to the techniques described herein. In particular, these preamble sequences have B Blocks populated with alternating nulls and random ±1 values. The B blocks of these preamble sequences were optimized (by a random search of over 2,000,000 random choices of B blocks) to yield low PAPR. As shown in FIG. 6, graph 600 includes a plot 602 that indicates PAPR over preamble for each of 128 preamble sequences. In addition, graph 600 includes a plot 604 that indicates PAPR over preamble and data symbols for each of 128 preamble sequences.

Figure 7:
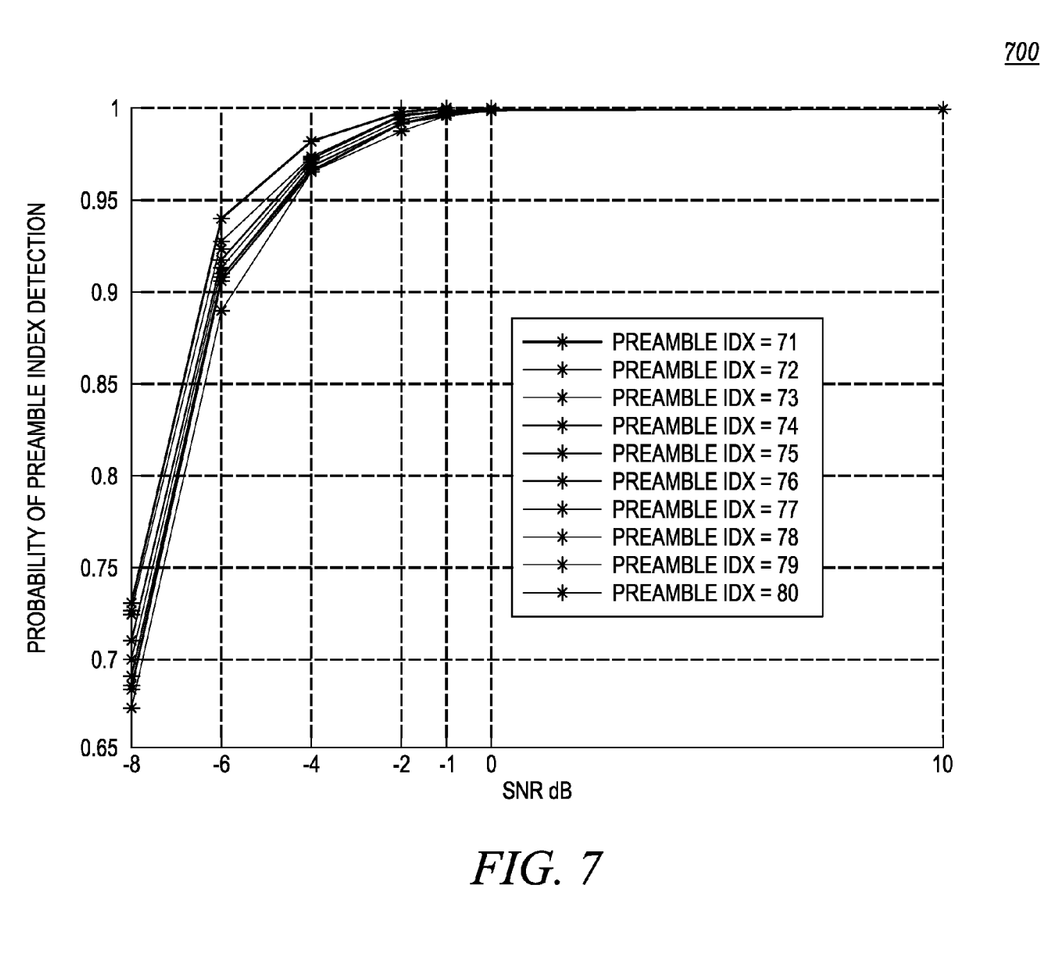

FIG. 7 is a graph 700 showing the probability of index detection versus signal to noise ratio (SNR) values for preamble sequences generated according to the techniques described herein. More particularly, graph 700 shows index detection probabilities achieved through single-stage detection techniques. However, as described herein, enhanced probabilities may be achieved through the employment of two-stage detection techniques. However, such two-stage techniques involve additional computations that may increase detection times. As in FIG. 6, these preamble sequences have B Blocks populated with alternating nulls and random ±1 values. FIG. 7 provides results for preamble indices 71 to 80. However, other indices bear similar detection probability.

Figure 8:
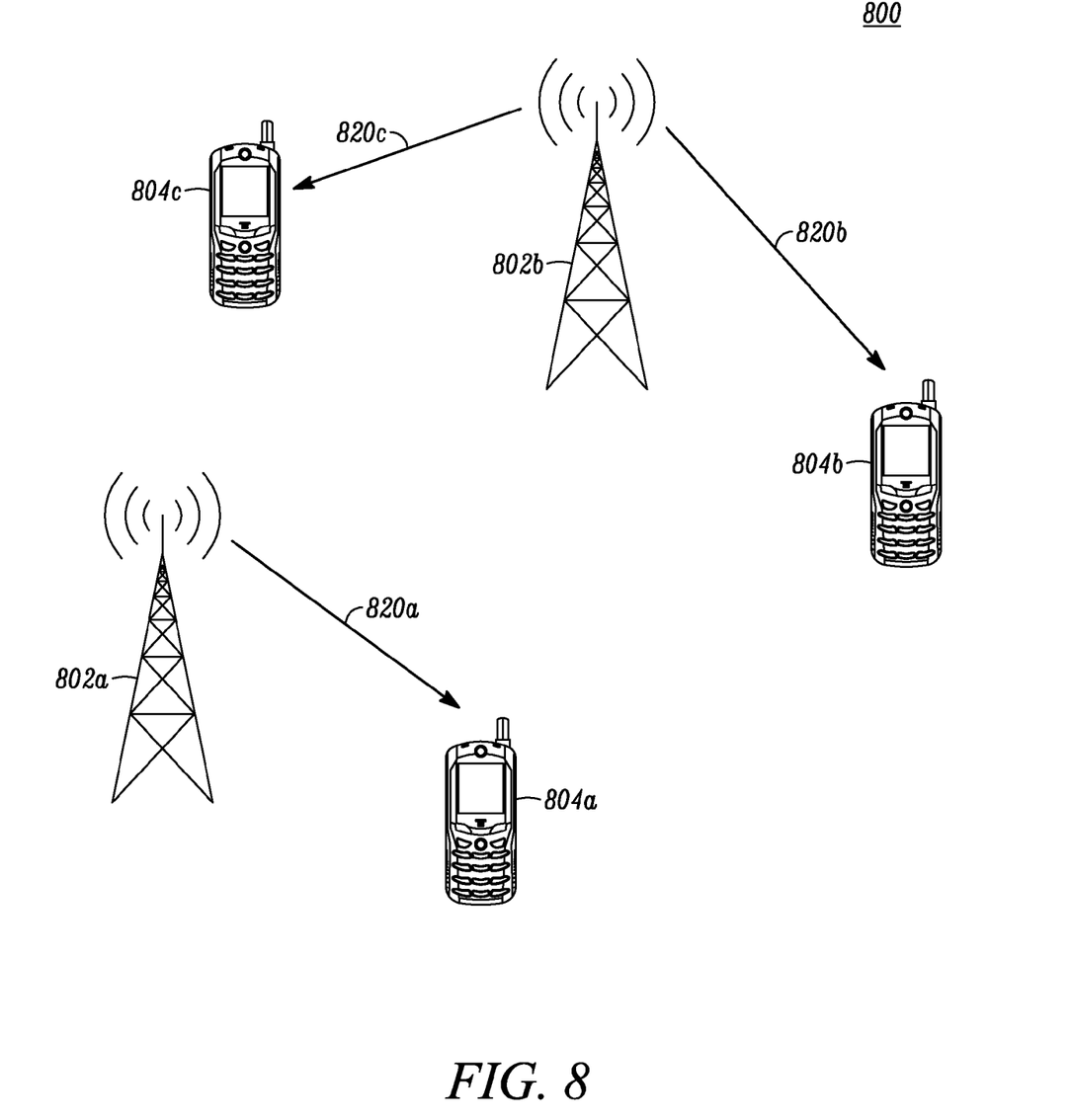
FIG. 8 is a diagram of an exemplary system.

FIG. 8 is a diagram of an exemplary system 800. As shown in FIG. 8, system 800 includes base stations 802a-b, and mobile subscribers 804a-c. In embodiments, base stations 802a-b and mobile devices 804a-c may employ implementations like or similar to the implementation of FIG. 3. However, other implementations may be employed.

In the example of FIG. 8, base station 802a serves mobile station 804a, and base station 802b serves mobile stations 804b and 804c. These devices may engage in wireless communications in accordance with WiMAX systems, WiMAX II systems, or other similar systems. The embodiments, however, are not limited to such systems.

FIG. 8 shows base station 802a sending a packet transmission 820a to mobile station 804a. Further, FIG. 8 shows base station 802b sending a packet transmission 820b to mobile station 804b and a packet transmission 820c to mobile station 804c.

These packet transmissions may each include a modulated preamble sequence, as described herein. Accordingly, each of these modulated preamble sequences may be from a set of preamble sequences. Such a set may include 128 preamble sequences that are based on a Hadamard matrix, as described above.

Further, base stations 802a and 802b may each employ a respective one of these preamble sequences in generating packet transmissions 820a-c. Accordingly, through the detection of such sequences by mobile devices 804a-c, the transmitting base station may be identified. Mobile devices 804*a-c* may each employ the two-stage preamble detection techniques, as described herein.

The preamble sequences generated according to the techniques described herein may provide several advantages. For example, such preamble sequences may yield OFDM symbols having first halves that are equal to their second halves. Thus, these preamble sequences may be used in conjunction with the known Schmidl-Cox algorithm for time and frequency synchronization. Further, such preamble sequences may have low PAPR. Moreover, such preamble sequences may occupy low bandwidth. This allows low bandwidth access terminals to maintain operation.

Also, these preamble sequences may span one OFDM symbol and work in a non-coherent acquisition mode. Further, such preamble sequences may be robust and usable in lower signal to interference and noise ratios (SINRs). This may allow fast cell selection at cell edges where the SINR is low. In addition, these preamble sequences may have low auto-correlation functions (except at zero delay) and low cross-correlation functions. This may provide for increased acquisition probabilities and increased index detection probabilities.

Moreover, in detecting preamble sequences, receiving devices may employ correlation techniques that require lower degrees of computational complexity over conventional approaches. Furthermore, with reference to the two-stage detection techniques described above, detection of a preamble sequence index may be performed by a structured search. Thus, a full search may be avoided. As a result of such techniques, preamble sequence detection may occur in less time. As a non-limiting example, the techniques described herein may provide for system acquisition within 20 milliseconds. Also, the sequences described herein allow for backward compatibility by employing search techniques that look for both new and legacy preambles.

Sequences described herein may have a length of 512 values. In the context of WiMAX and WiMAX II, this provides for multiband operations (e.g., at 5 MHz, 10 MHz, and 20 MHz). This is because receiving devices (regardless of their underlying bandwidth) only need to search a central contiguous block of 512 tones when such sequences are employed.

Additionally, the techniques described herein may provide 128 preamble sequences. In WiMAX systems, preamble sequences are used to identify cells. Currently, WiMAX systems employ 114 distinct cell IDs (or base station IDs). Therefore, the techniques described herein may provide additional distinct cell IDs. However, the greater number of available preamble sequences may also be used as codes not only for cell IDs, but also for other system parameters. Examples of such parameters may include operating bandwidth, duplex mode, and/or number of transmit antennas. However, the embodiments are not limited to these examples.

The exemplary preamble sequence format described above includes A blocks and B blocks. According to the format of Table 1, each A block may have a null on every other subcarrier. However, as indicated above, embodiments may employ A blocks having multiple nulls between non-zero values. This feature may be used to support various frequency reuse schemes. For instance, in embodiments, the number of nulls, N, between non-zero A block values may be determined according to $N=2r-1$, wherein r is the employed reuse factor. Thus, for a reuse factor of 3, 5 nulls should be inserted between non-zero A block values. Non-zero A block values may be generated according to the techniques described herein from a Hadamard (e.g., Sylvester matrix) having a size corresponding to the number of non-zero values. However, for B blocks, every other value may remain null, as such blocks may have a frequency reuse factor of 1. The embodiments, however, are not limited to these examples.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Thus, it should be understood that the various embodiments described herein have been presented by way of example only, and not in limitation. For instance, embodiments are not limited to WiMAX or WiMAX II implementations. Further, embodiments are not limited to implementations employing OFDM or OFDMA transmission techniques. Also, the embodiments are not limited to preamble sequences having lengths of 512 values. Also, the embodiments are not limited to preamble sequences having the format of Table 1, or to the other formats described herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a module to provide a preamble sequence having a plurality of values, each of the values corresponding to an orthogonal frequency division multiplexing (OFDM) subcarrier; and
a modulation module to produce an OFDM modulated signal from the preamble sequence;
wherein the plurality of values comprise multiple blocks of values based on a differentially encoded and scrambled row of a Hadamard matrix.

2. The apparatus of claim 1, wherein every other value in each of the multiple blocks is a null.

3. The apparatus of claim 1:
wherein the plurality of values comprise further multiple blocks of null values; and
wherein the multiple blocks and the further multiple blocks are arranged alternately within the preamble sequence.

4. The apparatus of claim 1:
wherein the plurality of values comprise further multiple blocks, each including alternating null and random values, and one of the further multiple blocks including a null value corresponding to a direct current (DC) OFDM subcarrier; and
wherein the multiple blocks and the further multiple blocks are arranged alternately within the preamble sequence.

5. The apparatus of claim 1, wherein each of the multiple blocks contains a plurality of non-zero values and a number of null values between each of the non-zero values, the number based on an employed frequency reuse factor.

6. The apparatus of claim 1, wherein the plurality of values comprise further multiple blocks of values, the further blocks of values selected to provide a low PAPR.

7. The apparatus of claim 1, wherein the preamble is included within a transmission packet.

8. The apparatus of claim 1, wherein the OFDM modulated signal from the preamble sequence is included in an OFDM symbol.

9. The apparatus of claim 1, wherein the Hadamard matrix is a Sylvester matrix.

10. The apparatus of claim 1, further comprising:
an antenna to wirelessly transmit the OFDM modulated signal.

11. The apparatus of claim 10, further comprising:
a remote device to receive the wirelessly transmitted OFDM modulated signal, demodulate the received OFDM modulated signal, and detect the preamble sequence from the demodulated signal.

12. The apparatus of claim 10, wherein the wirelessly transmitted OFDM signal is a Worldwide Interoperability for Microwave Access (WiMAX) signal and/or WiMAX II signal.

13. The apparatus of claim 1, wherein the module to provide the preamble sequence the module comprises memory to store the preamble sequence, wherein the memory is static random access memory (SRAM).

14. A method, comprising:
receiving a sequence of values; and
detecting one of a plurality of preamble sequences from the received sequence of values;
wherein each of the plurality of preamble sequences corresponds to a respective row of a Hadamard matrix, and each of the plurality of preamble sequences includes multiple blocks of values based on differentially encoded and scrambled values of the corresponding row of the Hadamard matrix.

15. The method of claim 14, wherein said detecting comprises:
selecting two or more candidate preamble sequences from the plurality of preamble sequences, the selection based on correspondences between a plurality of values in the received sequence of values and rows of the Hadamard matrix;
selecting the detected preamble sequence from the two or more candidate preamble sequences, the detected preamble sequence having a greatest correlation with the received sequence of values.

16. The method of claim 15, further comprising:
determining correlations between metrics based on the plurality of values in the received sequence of values and each row of the Hadamard matrix;
wherein said selecting the two or more candidate preamble sequences comprises selecting based on the determined correlations.

17. The method of claim 15, further comprising:
determining correlations between the received sequence of values with each of the two or more candidate preamble sequences; and
wherein said selecting the detected preamble sequence comprises selecting based on the determined correlations.

18. The method of claim 14, wherein said detecting comprises:
determining correlations between metrics based on a plurality of values in the received sequence of values and each row of the Hadamard matrix; and
selecting the detected preamble sequence based on the determined correlations.

19. The method of claim 14, wherein the Hadamard matrix is a Sylvester matrix.

20. An article comprising a computer-readable storage medium containing instructions that if executed enable a system to:
- receive a sequence of values; and
- detect one of a plurality of preamble sequences from the received sequence of values;

wherein each of the plurality of preamble sequences corresponds to a respective row of a Hadamard matrix, and each of the plurality of preamble sequences includes multiple blocks of values based on differentially encoded and scrambled values of the corresponding row of the Hadamard matrix.

* * * * *

UNITED STATES PATENT AND TRADEMARK OFFICE
CERTIFICATE OF CORRECTION

PATENT NO. : 7,801,231 B2
APPLICATION NO. : 11/862331
DATED : September 21, 2010
INVENTOR(S) : Vahid Tarokh et al.

It is certified that error appears in the above-identified patent and that said Letters Patent is hereby corrected as shown below:

In column 18, line 21, in claim 13, after "sequence" delete "the module".

Signed and Sealed this

Seventh Day of December, 2010

David J. Kappos
*Director of the United States Patent and Trademark Office*